United States Patent [19]

Takahashi

[11] Patent Number: 4,882,814
[45] Date of Patent: Nov. 28, 1989

[54] HOSE CLAMP FURNISHED WITH TACKING FUNCTION

[75] Inventor: Yasuo Takahashi, Yokohama, Japan

[73] Assignee: Kato Hatsujo Kaisha, Ltd., Kanagawa, Japan

[21] Appl. No.: 346,937

[22] Filed: May 3, 1989

[30] Foreign Application Priority Data

May 20, 1988 [JP] Japan ............................. 63-65783[U]
Aug. 8, 1988 [JP] Japan ........................... 63-104125[U]

[51] Int. Cl.⁴ ............................................. F16L 33/22
[52] U.S. Cl. ................................ 24/20 R; 24/20 CW; 24/279
[58] Field of Search ............... 24/20 R, 20 CW, 20 S, 24/20 EE, 20 TT, 22, 279, 20 W; 285/23

[56] References Cited

U.S. PATENT DOCUMENTS 3,008,206 11/1961 Meese et al. .
3,038,230 6/1962 Henning .
3,082,498 3/1963 Oetiker .
3,106,757 10/1963 Thurston et al. .
3,295,176 1/1967 Bright .
4,305,179 12/1981 Sakurada .
4,315,348 2/1982 Oetiker ................................. 24/279
4,773,129 9/1988 Muhr ................................. 24/20 R

FOREIGN PATENT DOCUMENTS 52-14511 4/1977 Japan .

Primary Examiner—Victor N. Sakran
Attorney, Agent, or Firm—Wenderoth, Lind & Ponack

[57] ABSTRACT

A hose clamp free from the possibility of a clamp body being accidentally displaced on the peripheral surface of a hose during the insertion of the hose around the terminal part of a connection pipe is attained by the incorporation therein of means capable of coming into resilient contact with the peripheral surface of the hose and inhibiting the clamp body from being displaced on the peripheral surface of the hose when the hose is inserted into the clamping ring part in a radially expanded state.

3 Claims, 8 Drawing Sheets

HOSE CLAMP FURNISHED WITH TACKING FUNCTION

BACKGROUND OF THE INVENTION AND RELATED ART STATEMENT

This invention relates to a hose clamp used for binding in place a rubber hose, for example.

The hose clamps of this type which have come into use to date will be explained. First, the hose clamp disclosed in U.S. Pat. No. 3,008,206 is cited. In this hose clamp, a clamp body comprising an annular clamping ring part and a pair of grip parts is formed of a resilient wire of a circular cross section. This is the most primitive of all of the hose clamps. It has a problem in respect that when it binds a given rubber hose, it exerts a concentrated stress upon the bound portion of the rubber hose and accelerates the aging of the rubber hose.

As a solution for the problem, the hose clamp disclosed in U.S. Pat. No. 3,038,230 has been proposed. This hose clamp comprises a clamp body formed of a resilient flat sheet material and screw members adapted to link the opposite terminal parts of the clamp body, so that the binding force of the clamp body may be adjusted with the amount of helical engagement of the screw members. It is, therefore, capable of repressing otherwise possible concentration of stress upon the bound portion of a rubber hose. Conversely, however, it entails a disadvantage that the opposite terminal parts of the clamp body are required to allow for extra spaces for accommodation of the screw parts and that the assembly of the hose clamp requires an unduly large number of steps.

Thus, the hose clamps disclosed in U.S. Pat. No. 3,082,498, No. 3,106,757 and No. 3,295,176 have been proposed. These hose clamps invariably comprise an annular clamp body formed of a resilient flat sheet material and adapted to have part of the circular wall thereof projected outwardly in such a manner that when the opposite sides of the projected wall are squeezed toward each other with a jig, the clamp body is shrunk radially and allowed to exert a binding force upon the rubber hose. Therefore, they entail a disadvantage that since the amount of this radial shrinkage of the clamp body has its limit, the rubber hoses capable of being bound by these hose clamps automatically have their dimensional limits.

In recent years, therefore, the hose clamp disclosed in U.S. Pat. No. 4,305,179 has come to find increasing utility. In this hose clamp, a clamp body formed of a resilient flat sheet material cut in a prescribed shape comprises an annular clamping ring part and a pair of grip parts raised from the opposite terminal parts of the ring part and extended in mutually opposite directions. Owing to this construction, this hose clamp is capable of repressing the otherwise possible concentration of stress during the course of clamping to the fullest possible extent and allowing for appreciable freedom in the variation of the diameter of the clamping ring part.

In this hose clamp, however, during the course of the work of inserting a rubber hose inside the clamping ring part, the clamping ring part must be expanded radially by squeezing the pair of grip parts toward each other with a tool. The field workers have expressed a desire for this hose clamp to be improved so as to eliminate the inconvenience encountered in this inevitable work of imparting a radial expansion to the ring part.

As an answer to this demand, the hose clamp disclosed in Japanese Utility Model Publication No. SHO 52-14511 has been proposed.

In this hose clamp, a clamp body formed of a resilient flat sheet material cut in a prescribed shape comprises an annular clamping ring part for clamping a rubber hose and a pair of grip parts raised from the opposite terminal parts of the ring part and extended in mutually opposite directions. The hose clamp is separately provided with a holder formed in a U-shaped cross section and adapted to retain the pair of grip parts in a state approximated to each other in spite of their resilient force.

When this hose clamp is put to actual use, the clamping ring part is radially expanded in advance by inserting the holder around the pair of grip parts in a state urged toward each other, thereby temporarily retaining the grip parts in the state of mutual approximation. Then, the rubber hose is inserted into the radially expanded clamping ring part and fitted on the terminal part of a connection pipe. Now, the holder is removed from the pair of grip parts to relieve the pair of grip parts of their mutual approximation and allow the clamping ring part to shrink radially automatically by the resilient force of its own, with the result that the rubber hose is bound fast on the pipe infallibly.

This hose clamp, therefore, enjoys an advantage of extremely simplifying the work of insertion of the rubber hose inside the clamping ring part because the radial expansion of the clamping ring part due to the use of the holder facilitates impartation of the state of radial expansion to the clamping ring part. When the rubber hose given to be clamped happens to have a relatively small diameter, however, it is often observed that the clamp body fitted in place in advance is compelled to move unexpectedly on the periphery of the rubber hose during the insertion of the rubber hose of small diameter around the terminal part of the connection pipe.

Once this phenomenon takes place, the field worker is compelled, after having inserted the rubber hose around the terminal part of the pipe, to reset the unexpectedly displaced clamp body to the prescribed clamping point of the rubber hose. The hose clamp, therefore, entails a disadvantage that this work of resetting will greatly annoy the field worker.

OBJECT AND SUMMARY OF THE INVENTION

The main object of this invention is to provide a hose clamp which is furnished with a tacking function which is capable of effectively inhibiting the accidental displacement of the clamp body during the work of clamping.

To accomplish this object, this invention presupposes a hose clamp which comprises a clamp body including an annular clamping ring part for clamping a hose and a pair of grip parts for filling the role of radially expanding the ring part, and a separately formed holder capable of retaining the pair of grip parts in a state of mutual approximation. In addition to the basic construction, the hose clamp is provided with displacement inhibiting means such that when the hose is inserted inside the radially expanded clamping ring part, the inhibiting means comes into resilient contact with the surface of the hose and inhibits the clamp body from being accidentally displaced on the periphery of the hose.

This invention has the displacement inhibiting means formed of a repressing plate assuming a curved surface different in curvature from the clamping ring part of the clamp body, so that the repressing plate is attached slidably to the inner side of the clamping ring part and allowed to come into resilient contact with the surface of the hose.

This invention otherwise has the displacement inhibiting means formed of a repressing arm disposed in a state tilted from the holder. In this construction, the repressing arm is brought into resilient contact with the surface of the hose.

The above and other objects, characteristic features and advantages of the present invention will be described more specifically below with reference to the accompanying drawings.

DETAILED DESCRIPTION OF THE PREFERRED EMBODIMENTS

Now, the present invention will be described below with reference to various preferred embodiments illustrated in the accompanying drawings.

Figure 1:
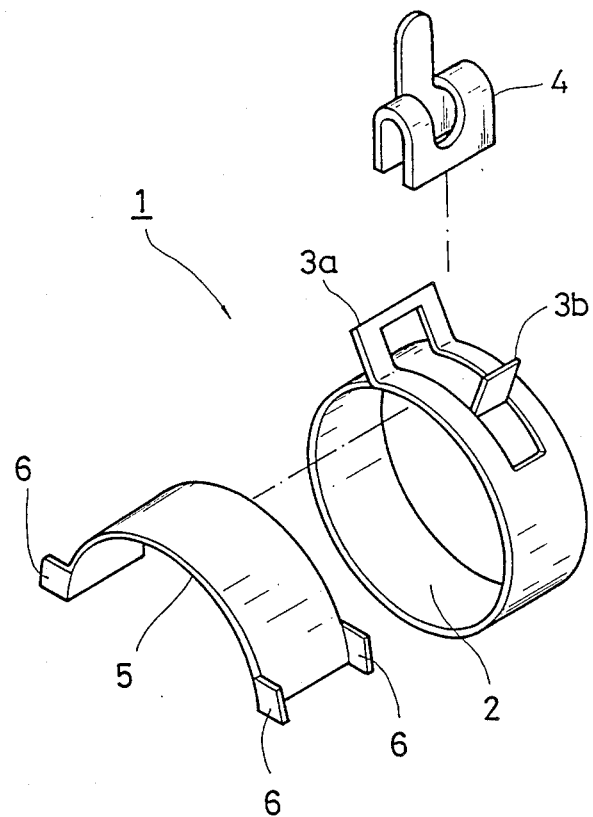
FIG. 1 is a perspective view illustrating in an exploded state a hose clamp furnished with a tacking function, as the first embodiment of this invention.

In the hose clamp contemplated as the first embodiment, similarly to a conventional hose clamp, a clamp body 1 formed of a resilient flat sheet material comprises an annular clamping ring part 2 and a pair of grip parts 3a and 3b adapted to fill the role of radially expanding the ring part 2 as illustrated in FIG. 1. This hose clamp is further provided with a separately formed holder 4 by means of which the pair of grip parts 3a and 3b can be retained in a mutually approximated state. It is characterized by being provided, separately of the holder 4, with a retaining plate 5 adapted to fill the role of displacement inhibiting means as described below.

Specifically in the first embodiment, the retaining plate 5 is formed of a resilient flat sheet material in the shape of a curved wall different in curvature from the clamping ring part 2. The retaining plate 5 of the shape of a curved wall is provided along the opposite lateral edges in the terminal parts thereof with small integrally formed engaging pieces 6 adapted to engage with the lateral edges of the clamping ring part 2 from outside. The retaining plate 2, owing to the engagement mentioned above, is allowed to assume a state opposed to the crossing portions of the grip parts 3a and 3b and fitted slidably to the inner side of the clamping ring part 2.

Figure 2A:
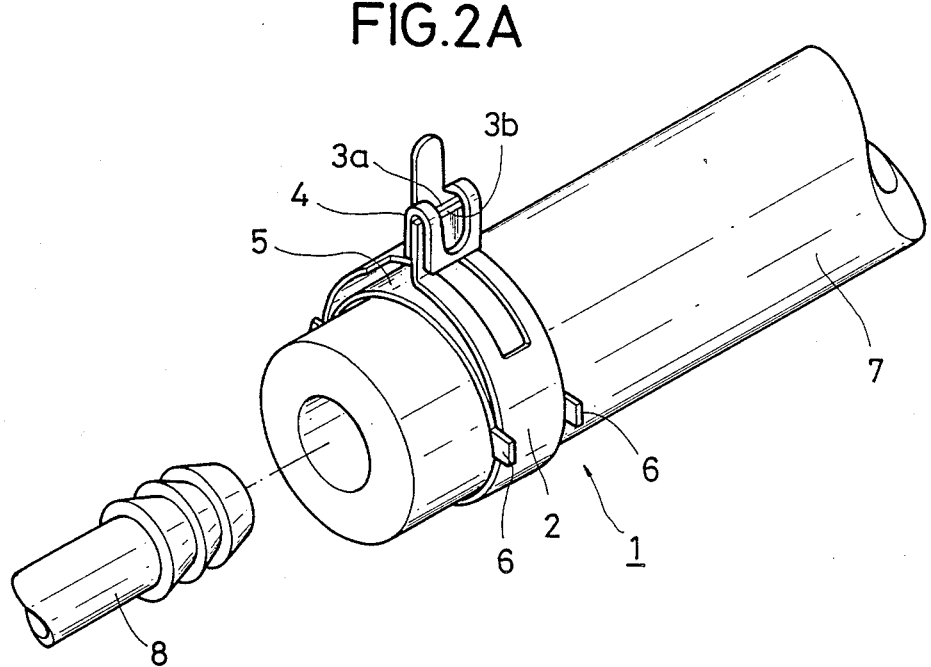
FIG. 2A is a perspective view illustrating the hose clamp in a state tacked to a rubber hose.

The use of the hose clamp constructed as described above in the clamping of a rubber hose 7 to the end part of a connection pipe 8 is effected, as practised heretofore and as illustrated in FIG. 2A, by inserting the holder 4 around the pair of mutually approximated grip parts 3a and 3b, thereby radially expanding the clamping ring part 2 forcibly, inserting the rubber hose 7 inside the radially expanded ring part 2, and subsequently fitting the rubber hose 7 around the end part of the connection pipe 8.

Figure 2B:
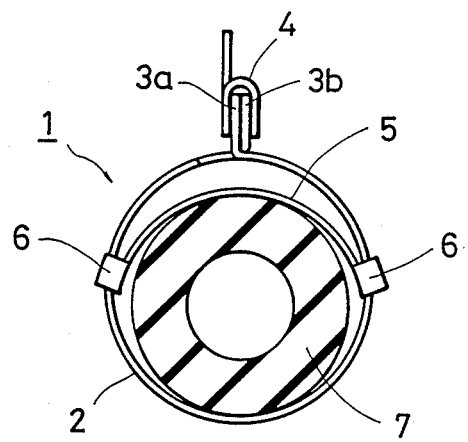
FIG. 2B is a cross section illustrating the hose clamp in the tacked state.

In the first embodiment, however, since the retaining plate 5 different in curvature from the ring part 2 is attached to the inner side of the clamping ring part 2 through the small engaging pieces 6 as described above, the retaining plate 5 comes into direct resilient contact with the surface of the rubber hose 7 and the clamp body 1 is allowed to be temporarily tacked to that portion of the hose 7 illustrated specifically in FIG. 2B when the rubber hose 7 is inserted into the clamping ring part 2 by virtue of the resilient bending of the retaining plate 5.

When the rubber hose 7 is inserted around the end part of the connection pipe 8 by virtue of the resilient contact of the retaining plate 5, therefore, the accidental displacement of the clamp body 1 on the periphery of the hose 7 cannot take place and the clamp body 1 can be tacked from the beginning to the clamped portion of the hose 7. Thus, the hose clamp of this invention has no use for the work of resetting the clamp body 1 to the clamped portion of the hose 7 which has been inevitably carried out heretofore.

Figure 3A:
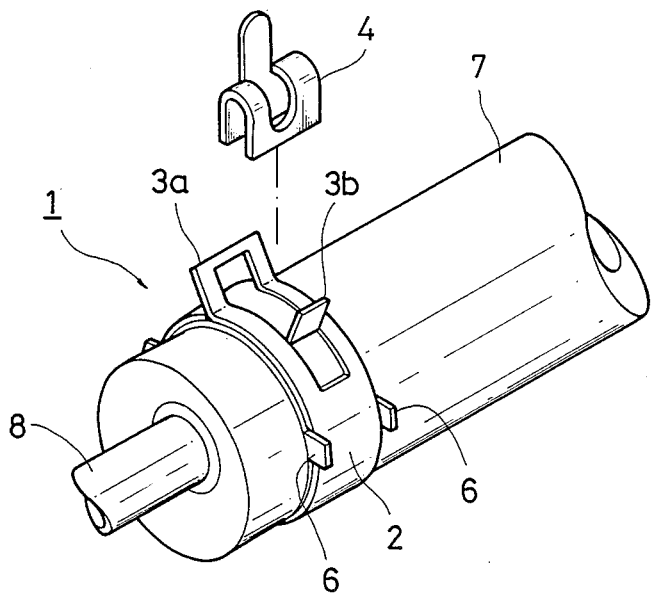
FIG. 3A is a perspective view illustrating a rubber hose in a state clamped with the hose clamp.

Thereafter, the holder 4 is removed from the pair of grip parts 3a and 3b to relieve the pair of grip parts 3a and 3b of mutual approximation as illustrated in FIG. 3A. Consequently, the clamping ring part 2 radially shrinks by virtue of the resilient force of its own and squeezes the outer peripheral surface of the rubber hose 7 infallibly. The hose 7, therefore, is infallibly fastened to the end part of the connection pipe 8.

Figure 3B:
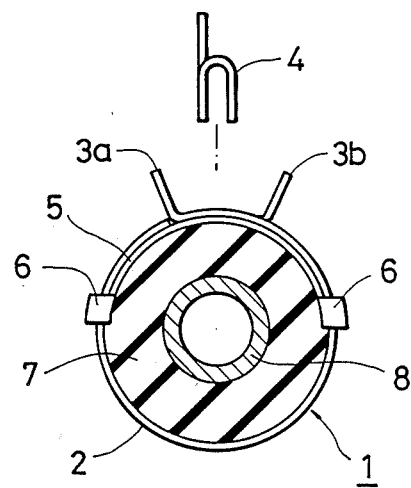
FIG. 3B is a cross section illustrating the hose clamp in a state having the rubber hose clamped therewith.

Moreover, in this state of fast clamping, the retaining plate 5 is brought into direct surface contact with the surface of the rubber hose 7 as illustrated specifically in FIG. 3B and is consequently enabled to squeeze the hose 7 with a uniform clamping force and, at the same time, prevent the crossing portions of the grip parts 3a and 3b from coming into contact with the surface of the hose 7. Thus, without being partly nipped between the crossing portions of the grip parts 3a and 3b, the rubber hose 7 is liberated perfectly from the possibility of sustaining injury or yielding to deterioration.

In addition to bringing about the operation and effect described above, the interposition of the retaining plate 5 between the rubber hose 7 and the crossing portions of the grip parts 3a and 3b serves to smoothen the displacement of the crossing portions of the grip parts 3a and 3b. Even when the rubber hose 7 suffers from loss of diameter by aging, the clamping ring part 2 is allowed to shrink radially easily in concert with the displacement of the crossing portions which follows the decrease of diameter. The possibility of the state of fast clamping being degrated by the aging of the hose 7, therefore, is nil.

Figure 4:
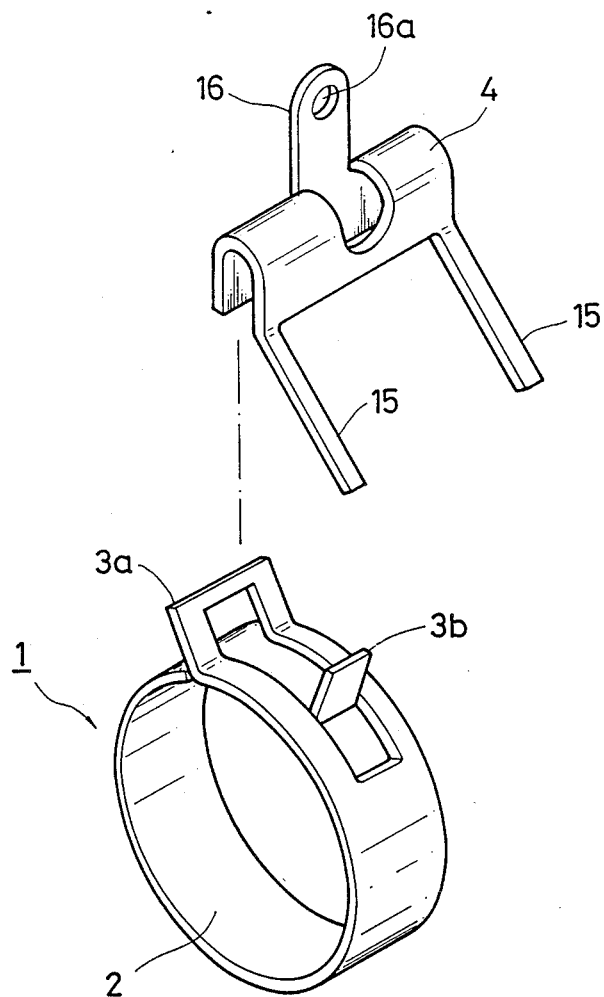
FIG. 4 is a perspective view illustrating in an exploded state a hose clamp furnished with a tacking function, as the second embodiment of the present invention.
Figure 5A:
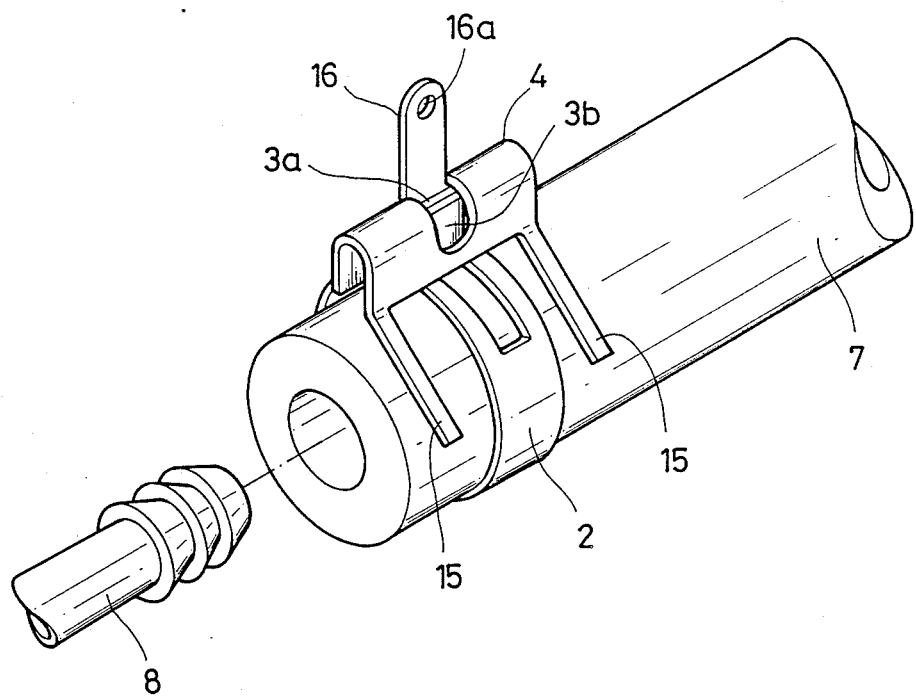
FIG. 5A is a perspective view illustrating the hose clamp in a state tacked to a rubber hose.
Figure 5B:
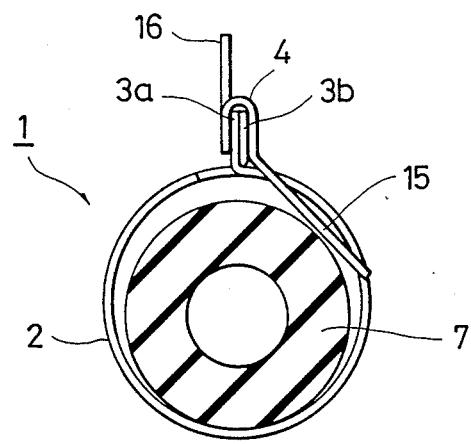
FIG. 5B is a cross section illustrating the hose clamp in a state having the rubber hose clamped therewith.

Now, the hose clamp contemplated as the second embodiment of this invention will be described. The hose clamp of this embodiment, as illustrated in FIG. 4, presupposes a construction in which a clamp body 1 formed of a resilient flat sheet material comprises an annular clamping ring part 2 and a pair of grip parts 3a and 3b adapted to fill the role of radially expanding the ring part 2 and in which a holder 4 is adapted to play the role for retaining the pair of grip parts 3a and 3b in a mutually approximated state. This hose clamp is characterized by being integrally provided on the holder 4 itself with retaining arms 15 destined to serve as displacement inhibiting means.

Specifically in the second embodiment, the holder 4 itself is formed with a cross section of the shape of inverted U so as to be readily inserted around the pair of mutually approximated grip parts 3a and 3b. The holder 4 is further provided with a pair of retaining arms 15 extended and tilted with a fixed angle from the opposite end parts of one of the opposite lateral walls of the holder 4 having the cross section of inverted U. Owing to this construction, the pair of retaining arms 15 are allowed to have their inner sides brought into resilient contact with the outer surface of the hose 7.

Further, in the second embodiment, a handling piece 16 of a relatively large area is integrally formed by partial punching or welding as raised from the other wall side of the holder 4. When this large handling piece 16 is nipped and pulled up with a tool, the holder 4 can be easily removed from the grip parts 3a and 3b. By visual discernment of the presence or absence of this large handling piece 16, it can be readily confirmed whether or not the holder 4 is still kept fitted on the grip parts 3a and 3b.

For the purpose of this confirmation as to the discrimination between the presence and the absence of the handling piece 16, it is sufficient to give conspicuous largeness to the handling piece 16. The handling piece 16, when necessary for enhanced conspicuity, may be coated with a fluorescent coating material or formed of a reflecting sheet so as to impart ot the handling piece 16 an ability to reflect light. Alternatively, it is permissible to perforate in the handling piece 16 a hole 16a of a shape easy of visual identification.

The use of the hose clamp constructed as described above in the clamping of the rubber hose 7 to the terminal part of the connection pipe 8, similarly to the hose clamp of the first embodiment, is attained by inserting the holder 4 having the cross section of inverted U around the pair of mutually approximated grip parts 3a and 3b, thereby radially expanding the clamping ring part 2 forcibly and inserting the rubber hose 7 inside the radially expanded ring part 2.

In the second embodiment, however, while the holder 4 is kept fitted around the pair of grip parts 3a and 3b, the pair of retaining arms 15 extended from the opposite terminal parts of one lateral wall of the holder 4 come into resilient contact sideways with the outer surface of the hose 7. Owing to the resilient contact, the inner sides of the pair of retaining arms 15 are brought into resilient contact with the peripheral surface of the rubber hose 7 and the clamp body 1 is temporarily tacked infallibly at that portion of the hose 7 as soon as the rubber hose 7 is inserted into the clamping ring part 2.

Moreover, the retaining arms 15 are extended in a tilted state relative to the holder 4 so as to contact the outer surface of the rubber hose 7 and, as a result, the inner sides of the tilted retaining arms 15 are brought into resilient contact with the outer surface of the hose 7. Owing to the construction, the retaining arms 15 are allowed to have a large length. When the retaining arms 15 are formed with as large a length as possible, the inner sides of the retaining arms 15 come into resilient contact with the outer surface of the hose 7 infallibly and the clamp body 1 is allowed to manifest the tacking function to the fullest extent even if the diameter of the hose 7 being clamped is much smaller than that of the clamping ring part 2 in its radially expanded state.

The retaining arms 15 are allowed to have their own inner sides come into resilient contact sideways with the hose 7. Even when the necessity arises for displacing the clamp body 1 on the peripheral surface of the hose 7, therefore, smooth slide of the clamp body 1 on the hose can be guaranteed without entailing the possibility of inflicting injury upon the surface of the hose 7.

In the second embodiment, therefore, the possibility of the clamp body 1 being accidentally displaced on the peripheral surface of the hose 7 during the insertion of the rubber hose 7 around the terminal part of the connection pipe 8 is completely eliminated. Thus, the clamp body 1 can be tacked from the beginning at the clamped portion of the hose 7. The hose clamp of the second embodiment has absolutely no use for the work of resetting the clamp body 1 to the clamped portion of the hose 7 after the rubber hose 7 has been inserted around the terminal part of the pipe 8.

Figure 6:
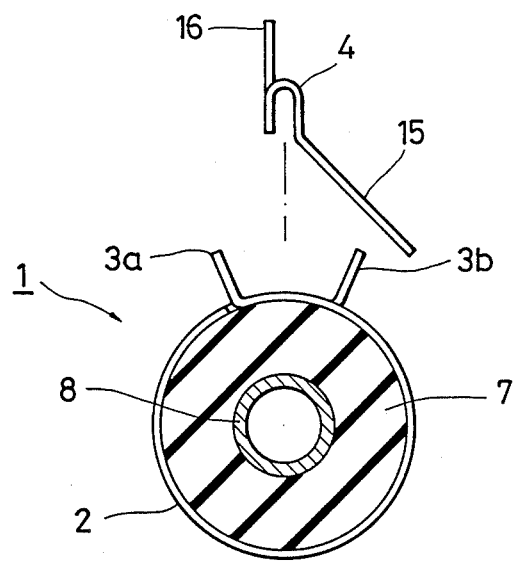
FIG. 6 is a cross section illustrating the hose clamp in a state clamping the rubber hose.

Thereafter, the holder 4 is removed out of the pair of grip parts 3a and 3b with the aid of the holding piece 16, as shown in FIG. 6, to relieve the pair of grip parts 3a and 3b of the state of mutual approximation. Consequently, the clamping ring part 2 radially contracts by virtue of the resilient force of its own and squeezes the peripheral surface of the rubber hose 7 infallibly. Thus, the hose 7 is fastened infallibly to the terminal part of the connection pipe 8.

When any of the holders 4 used during the course of the work of clamping a rubber hose 7 happens to remain unremoved from the corresponding clamp body 1, since the handling piece 16 of a relatively large size is raised in a conspicuous manner from the other lateral wall of the holder 4 as described above, the presence of this handling piece 16 ensures easy confirmation of the fact that the holder 4 has not been removed. Thus, the possible occurrence of a clamp body 1 escaping due attention can be prevented without fail.

Figure 7A:
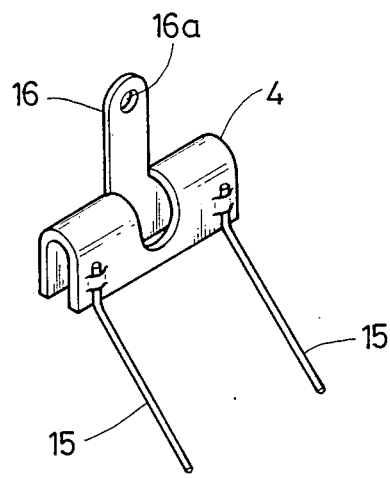
FIG. 7A is a perspective view illustrating a holder using another version of repressing arm.
Figure 7B:
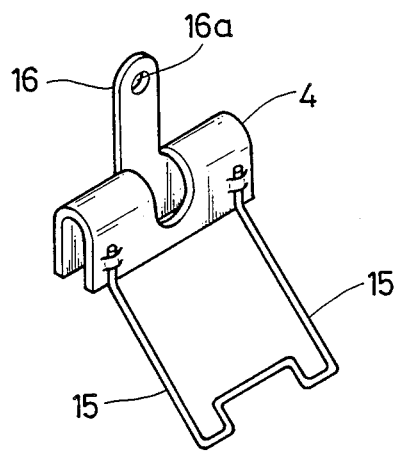
FIG. 7B is a perspective view illustrating a holder using still another version of repressing arm.

In the second embodiment described above, the retaining arms 15 adapted to manifest the tacking function are depicted as integrally formed by bending the same material as the holder 4. The pair of retaining arms 15, when desired for the convenience of use, may be formed separately of the holder 4 with a resilient wire material and the retaining arms 15 made of the wire material may be fastened to the prescribed portions on one lateral wall of the holder 4 by welding or the like means, as illustrated in FIGS. 7A and 7B.

Figure 8:
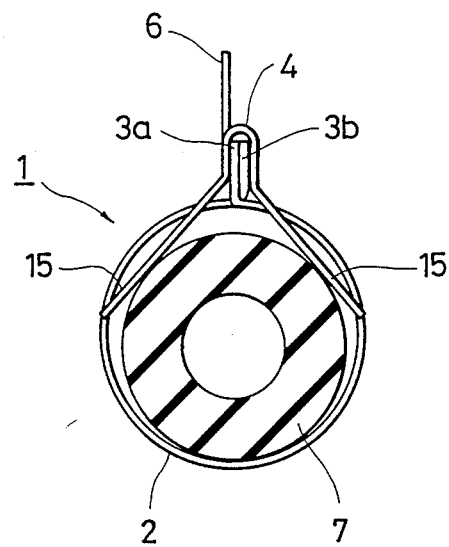
FIG. 8 is a cross section illustrating yet another version of repressing arm in a state having the clamp body tacked to a rubber hose.

Further, as illustrated in FIG. 8, another pair of retaining arms 15 may be formed in the opposite terminal parts of the other lateral wall of the holder 4 and this pair of retaining arms 15 and the pair of retaining arms 15 on the first lateral wall may be brought into resilient contact sideways with the outer surface of the rubber hose 7, when required for the convenience of use. In this case, the clamp body 1 can be tacked with enhanced certainty on the peripheral surface of the hose 7 because the tacking force produced in this construction is twice as large as in the second embodiment described above.

The hose clamp of this invention is characterized, as described above, by being provided with means capable of coming into resilient contact with the peripheral surface of the hose and prohibiting the clamp body from being displaced on the peripheral surface of the hose when the hose is inserted inside the radially expanded clamping ring part. Even when the hose being clamped happens to have a relatively small diameter, therefore, since the displacement inhibiting means is allowed to come into direct resilient contact with the peripheral surface of the hose being clamped and effect required tacking of the clamp body at the position, the possibility of the clamp body being accidentally displaced on the peripheral surface of the hose during the insertion of the hose around the terminal part of the connection pipe is completely eliminated.

Since the clamp body can be tacked from the beginning at the clamped portion of the hose, the hose clamp of this invention has absolutely no use for the work of resetting the clamp body to the clamped portion of the hose after the rubber hose has been inserted around the terminal part of the hose.

What is claimed is:

1. A hose clamp furnished with a tacking function, comprising:
    a clamp body including an annular clamping ring part for squeezing a hose and a pair of grip parts for filling the role of radially expanding said ring part;
    a separately formed holder capable of retaining said pair of grip parts in a state of mutual approximation; and
    displacement inhibiting means capable of coming into resilient contact with the peripheral surface of a hose and inhibiting said clamp body from being displaced on the peripheral surface of said hose when said hose is inserted inside said clamping ring part in a radially expanded state.

2. A hose clamp according to claim 1, wherein said displacement inhibiting means is formed of retaining plates assuming a curved wall different in curvature from said clamping ring part of said clamp body, being slidably attached to the inner side of said clamping ring part and coming into resilient contact with the peripheral surface of said hose.

3. A hose clamp according to claim 1, wherein said displacement inhibiting means is formed of retaining arms disposed on and tilted from said holder and allowed to come into resilient contact with the peripheral surface of said hose.

* * * * *